Oct. 25, 1949.                J. P. SEAHOLM                2,486,214
                              MANURE SPREADER
Filed Sept. 18, 1944                                  3 Sheets-Sheet 1

Inventor
JOHN P. SEAHOLM
By Carlsen + Hazle
Attorneys

Oct. 25, 1949.  J. P. SEAHOLM  2,486,214
MANURE SPREADER
Filed Sept. 18, 1944  3 Sheets-Sheet 2

Inventor
JOHN P. SEAHOLM

By Carlsen + Hoyle
Attorneys

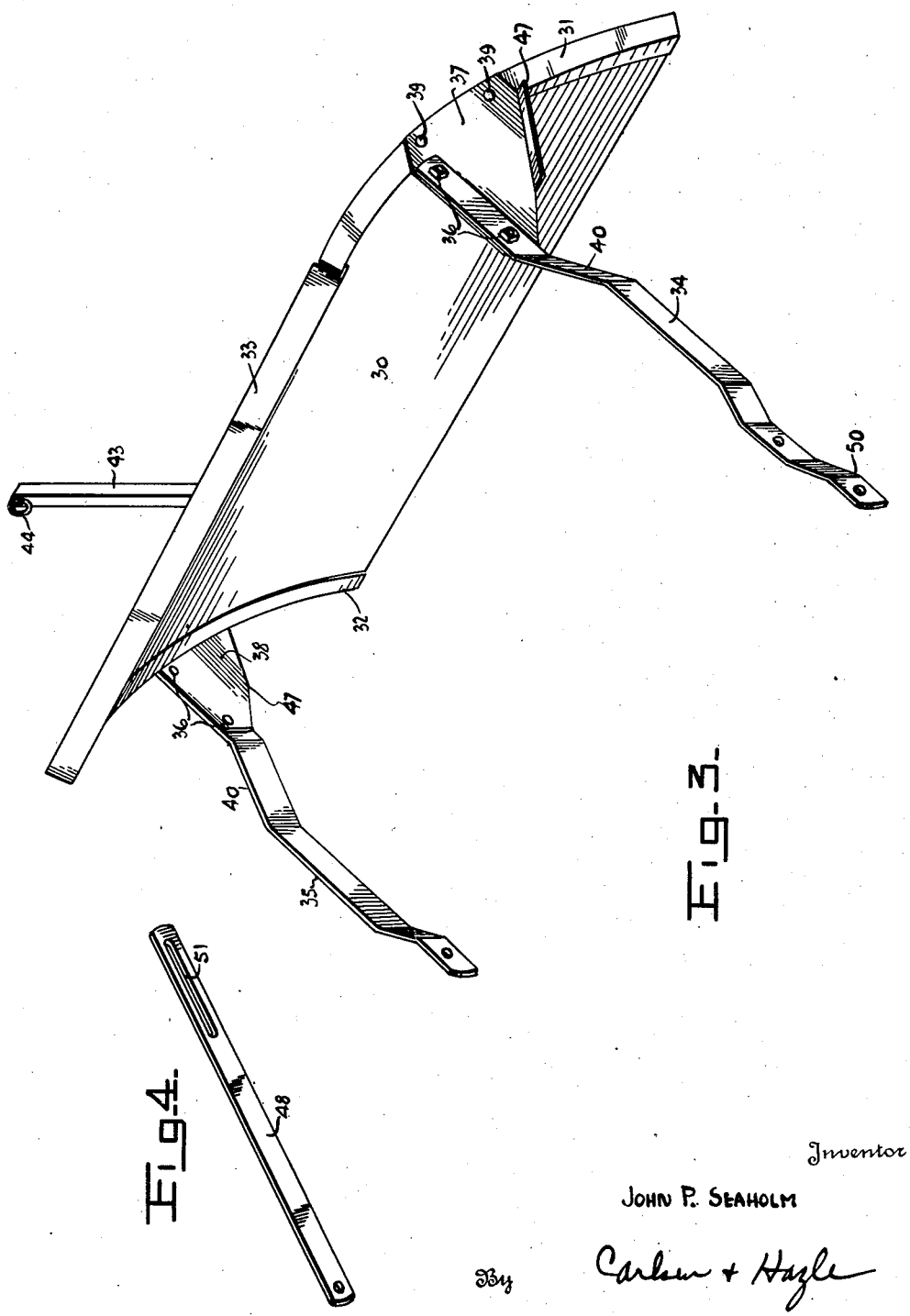

Patented Oct. 25, 1949

2,486,214

UNITED STATES PATENT OFFICE 2,486,214

MANURE SPREADER

John P. Seaholm, Moline, Ill., assignor, by mesne assignments, to Minneapolis-Moline Company, Hopkins, Minn., a corporation of Minnesota Application September 18, 1944, Serial No. 554,587

7 Claims. (Cl. 275—6)

This invention relates to improvements in fertilizer spreaders.

In the operation of this type of equipment it is found that the fertilizing material has a tendency to fall from the spreader during transport and this is particularly undesirable when the material is transported along highways, such transportations being in fact prohibited by some states unless means are provided to prevent this loss. In the ordinary spreader the body or box is open at the rear, the only closure being the main beater located thereat and which is of such nature that loose or sloppy material may escape without much interference. It is the primary object of my present invention to provide an end gate which may be readily lowered into position for closing the rear end of the spreader box, forwardly of the beater, and which will then effectively prevent the escape of the material. The gate may, of course, be raised when the machine is put in operation for spreading the material but while in transit the loss of material will be prevented.

Another object is to provide an end gate structure having a novel arrangement for clearing the material as it is raised, thus overcoming the tendency of the material to pack against the gate, due to the vibration in transport, from hindering the raising of the gate.

A further object is to provide a novel means for locking the usual bed conveyor against operation when the gate is lowered and to thus prevent packing against the gate from this cause, or packing against the beater as it is started. The latter effect frequently causes breakage of the beater but by virtue of the protection of the gate, and interlock between the gate and bed conveyor such breakage will be effectively prevented.

These and other more detailed and specific objects will be disclosed in the course of the following specification, reference being had to the accompanying drawing, in which—

Fig. 3 is a perspective view of the gate and its supports alone.

Fig. 4 is a similar view of the locking arm alone.

Figure 1:
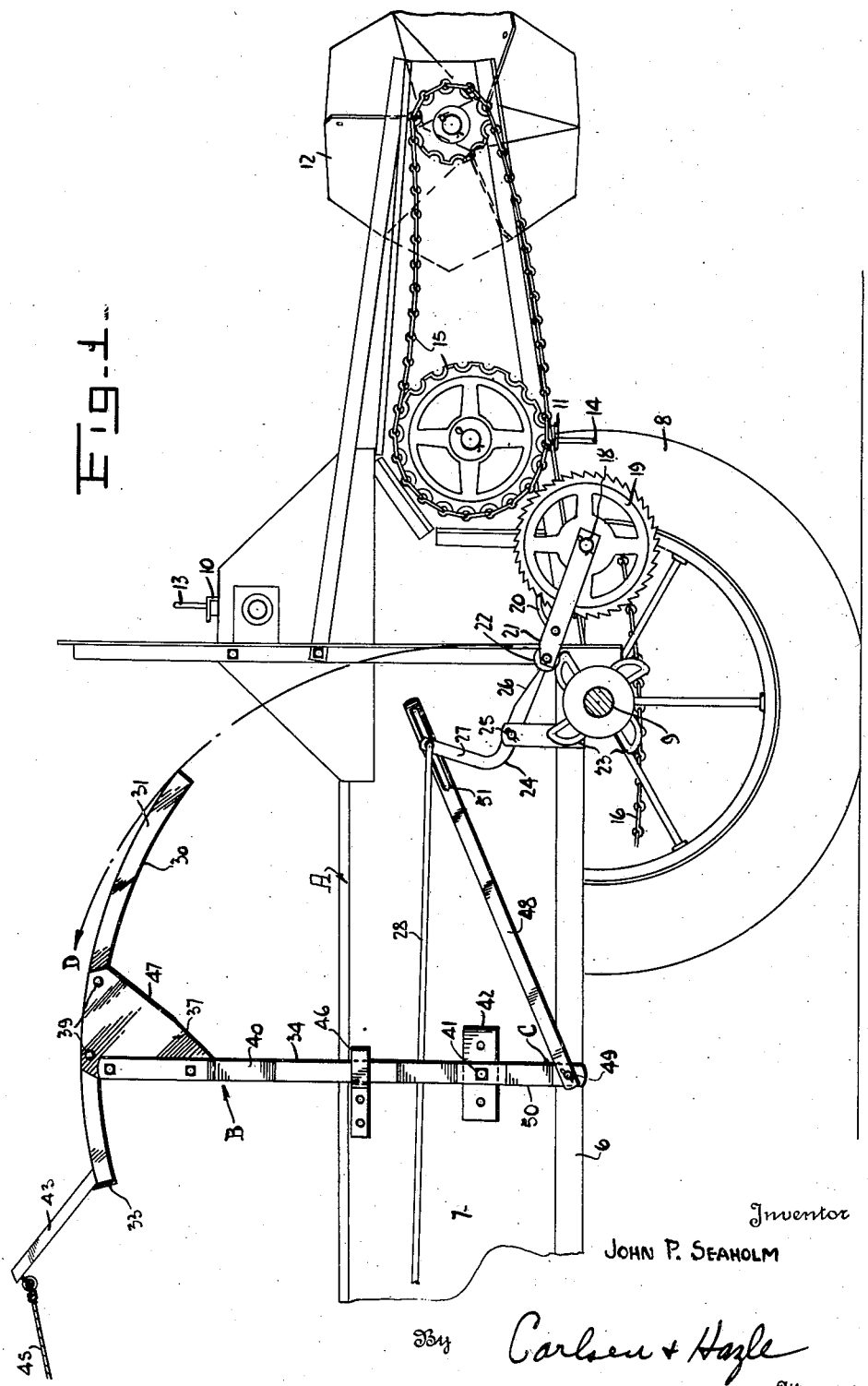
Fig. 1 is a side elevation of the rear end portion of a spreader equipped with the end gate of my invention, the gate being shown in its raised position.

Referring now more particularly and by reference characters to the drawing, A designates generally a fertilizer or manure spreader which of itself is of conventional design and of which only the box and rear portions are shown. To this spreader I apply my improved tail gate structure which is designated generally at B.

The spreader A comprises a box or body having a bottom or bed 6 and upright sides 7, the rear end being normally open to deliver material carried in the box toward a spreader and beater mechanism or assembly located rearwardly of the box. The box is wheel-supported by front wheel (not shown) and by rear wheels 8 which rotate a live axle 9 journaled crosswise beneath the rear end portion of the bed 6. The beater and spreader mechanism is wholly conventional in construction and operation, comprising an upper beater 10, a lower main beater 11 and a rearwardly located spreader 12. The beaters 10 and 11 have fingers 13—14 which beat and shred the material and the spreader 12 spreads the material over a wide path as the machine moves forwardly over the field. The beaters 10 and 11 and spreader 12 are all driven from the rear axle 9 by a conventional drive mechanism, a part of which is shown and indicated at 15.

Also forming a part of the conventional construction is a bed conveyor 16 which runs rearwardly at its upper flight along the box bed 6 to deliver the material positively out through the open rear end of the box to the beaters. The conveyor 16 is driven at its rear end by sprockets 17 which are located on a shaft 18 rotated by a ratchet wheel 19 (Fig. 1). The ratchet wheel 19 is moved by a ratchet pawl 20 carried by an arm 21 swingable on the shaft 18 and the arm carries at its extremity a roller 22 for cooperation with a series of cams 23 operated by the rear axle 9. Obviously each cam 23 will raise the arm 21 causing the pawl 20 to work the wheel 19 around a short distance and cause the bed conveyor 16 to travel, as the machine moves forwardly over the field.

Figure 2:
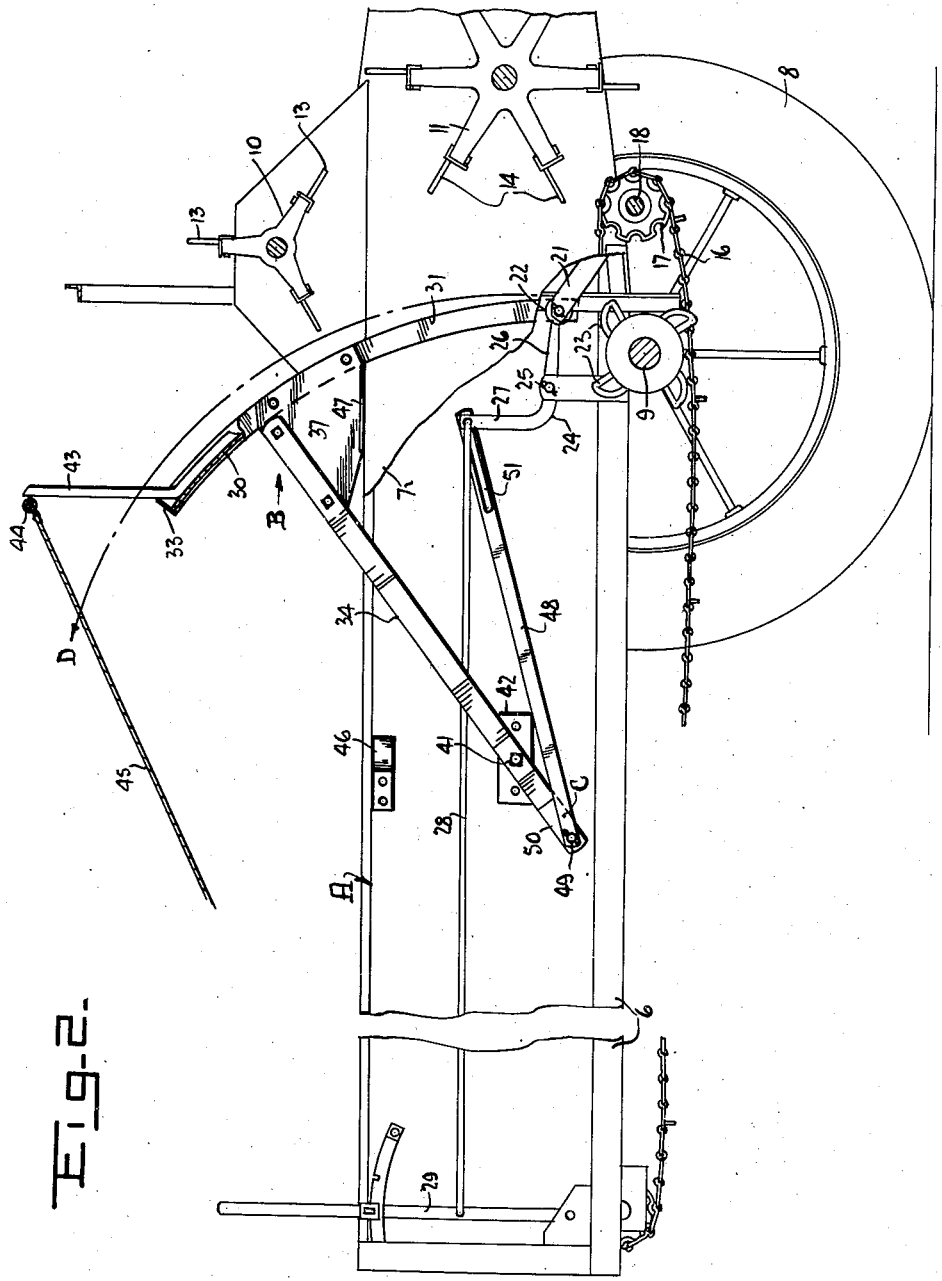
Fig. 2 is a similar view but with parts broken away and in section, and in this case illustrating the gate in its lowered position.

To halt the bed conveyor the arm 21 may be raised as seen in Fig. 2 so that the roller 22 clears the cams 23 and for this purpose there is provided a control means comprising a bell crank lever 24 which is pivotally attached at 25 to one side 7 of the box. One arm 26 of the lever 24 engages the arm 21 while the other, upright arm 27 of the lever has connected thereto a rod 28 extending forwardly to a hand lever 29. By pulling upon the rod 28 and swinging the upper end of the lever 24 forwardly the arm 21 will be raised, stopping the bed conveyor 16, whereas reversing this action will lower the arm so that the cams 23 will again actuate the conveyor.

In the operation of the spreader as thus far described, and as it is presently used, it will be evident that in transporting the material there will be a pronounced tendency for the material to escape from the open rear end of the box through and around the beaters. The vibration during transport aggravates this tendency, or if the characteristics or consistency of the material is such that little escapes, such vibration has a tendency to pack the material in and around the beaters making starting thereof difficult. In fact breakage of the fingers 13 or 14 frequently results from this action, or from starting the bed conveyor 16 in operation before the beaters are started. All these are undesirable factors in the operation of the machine and all are avoided by my invention as will now be described.

The gate structure B comprises a gate member 30 of sheet material formed into an arcuate shape and braced at its lateral edges by angles 31–32 and by a similar angle 33 across its upper edge. The width of this gate member is such that it may (Fig. 2) fit downward nicely between the sides 7 of the box to close the normally open rear end thereof while the dimension vertically is such that, in such position, the gate member will project well above the top of the box.

The gate member 30 is swingably supported by arms 34—35, which are secured at 36 to gusset or brace plates 37—38 fastened at 39 on the side bracing angles 31—32. The arms 34—35 thus are rigidly connected to the gate and extend substantially radially therefrom and in a forward, downward direction. The arms are outwardly offset at 40 so that their ends remote from the gate may fit outwardly of and clear the box sides 7 to which the arms are pivoted, on a horizontal transverse axis, by the bolts 41. Said bolts 41 are carried by plates 42 secured to the box sides and when thus mounted it will be apparent that the gate member may swing in an upright plane from a lowered position operative to close the rear end of the box, forward of the beaters to a raised inoperative position (Fig. 1) whereat the lower edge of the gate stands well above the box. For thus manipulating the gate it is provided with an arm or member 43 secured to its upper edges and extending upwardly therefrom, and the arm is provided with a ring 44 to which a rope 45 may be attached and led to the forward end of the spreader. A pull on this rope 45 will then raise the gate, until the arms 34—35 are stopped by the clips or stops 46 secured to the box sides, while slacking off the rope will enable the gate to fall of its own weight down into the box to shut off the flow of material therefrom.

The downward movement of the gate is limited by stop flanges 47 formed on the plates 37—38 in a position for engaging the upper edges of the box sides 7 as the gate is lowered. When thus stopped the lower edge of the gate just clears the bed conveyor 16 as seen in Fig. 2.

Attention is called to the location of the center C in Figs. 1 and 2 from which is determined the radius of the curvature of the gate member 30. This center is eccentric to the axis of the arm pivots 41 about which the gate member swings in such manner that as the gate swings upwardly from lowered position it has a rearward component of motion. This is indicated by the arrows D which designate the path of the lower edge of the gate member. This action has the effect of causing the gate to clear the material which may pack against its forward side during transport and greatly facilitates its lifting.

When the gate is lowered it will be evident that it so closes the rear end of the box that the material cannot escape during transport, thus allowing the spreader to travel along roads and highways without trouble from this cause. In addition the gate prevents the material from packing against the beaters so that they are difficult to start when the destination is reached, such action sometimes even causing the beater fingers to be broken.

Another cause of such breakage results from the starting of the bed conveyor 16 before the beaters are started, so that the material is fed against the beaters too soon. I accordingly provide a locking means in the form of a bar 48 which at its forward end is pivoted at 49 to an extension 50 of the arm 34 beyond its pivot 41. The rear end of the bar 48 is slotted at 51 to fit over the end of the rod 28 where it is hooked on the bell crank lever 24. The arrangement is such that in the down position of the end gate the bar 48 is pulled forward and the rear end of the slot 51 engages this end of the rod 28 so that the lever 24 cannot swing rearwardly to drop the roller 22 into the path of the cams 23. The bed conveyor 16 thus cannot operate while the end gate is lowered and this prevents the material from being forced against the gate. As the gate is raised, however, the slot 51 moves rearwardly so that lever 24 may swing rearwardly to set the bed conveyor in operation. Some little time will be required before any large quantity of material is packed against the beaters, so that more than adequate time is assured for their starting, if they are not, in fact and as more proper, started before the end gate is even raised. Obviously then there will be little excuse for breakage of the beater fingers from this cause.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In combination with a fertilizer spreader having a box normally open at its rear, a conveyor in the box, and a spreader mechanism at the rear of the conveyor; a gate for closing the rear end of the box and having laterally disposed rigidly attached arms extending forwardly and fixedly pivoted to the sides of the box whereby the gate may be swung upwardly and forwardly with said arms to open the rear of the box, and means for raising the gate from closed to open positions, the lower end of the gate being spaced farther from such pivot than the upper end whereby the gate will space itself rearwardly of the load when swung upwardly.

2. In combination with a fertilizer spreader having a box normally open at its rear, a conveyor in the box, and a spreader mechanism at the rear of the conveyor; a gate for closing the rear end of the box and having laterally disposed rigidly attached arms extending forwardly and fixedly pivoted to the sides of the box whereby the gate may be swung upwardly and forwardly with said arms to open the rear of the box, the load engaging surface of the gate being sloped slightly forwardly with respect to the vertical, when in its lowered position, and the point of pivot attachment of the arms to the box being above the load-supporting surface of the conveyor whereby initial upward movement of the gate will separate its load engaging surface from the load.

3. In combination with a fertilizer spreader having a box normally open at its rear, a conveyor in the box, and a spreader mechanism at the rear of the conveyor; a gate for closing the rear end of the box and having laterally disposed rigidly attached arms extending forwardly for pivotal attachment to the sides of the box whereby the gate may be swung upwardly and forwardly with said arms to open the rear of the box, and means for raising the gate from closed to open positions, said gate being curved vertically and forwardly in an arc the axis of which is forward of the gate but eccentric with respect to the pivotal attachment of the arms to the box.

4. The combination with a fertilizer spreader having a box, a conveyor in the box, and a distributor at the rear of the conveyor, of a gate for closing the rear end of the box forwardly of the distributor, arms extending rigidly from the gate and forwardly along the sides of the box, coaxial fixed pivots connecting forward ends of the arms to the sides of the box, said gate having a load engaging surface curved in an arc the axis of which is below and eccentric with respect to the common axes of said pivots when the gate is in its closed position.

5. In combination with a manure spreader having a load carrying box, a gate for closing the rear end of the box, arms extending rigidly from opposite ends of the gate and forwardly along the sides of the box, means concentrically pivoting the arms to the box sides for movement about fixed axes, said gate being vertically curved in an arc the axis of which is spaced below the axis of said pivots.

6. The combination with a fertilizer spreader having a box, a conveyor operating in the bottom of the box, a distributor at the rear of the conveyor, and disconnectable means for driving the conveyor, of a gate for closing the rear end of the box, arms extending forwardly from the ends of the gate along the sides of the box and fixedly pivoted to the sides of the box whereby the gate may be swung upwardly and forwardly to open the rear end of the box, and means connected with and operated by one of the arms for effectively connecting and disconnecting the said driving means for the conveyor when the gate is respectively moved to open and closed positions.

7. The combination with a fertilizer spreader having a box, a conveyor operating in the bottom of the box, a distributor at the rear of the conveyor, and means for driving the conveyor, of a gate for closing the rear end of the box, arms extending forwardly from the ends of the gate along the sides of the box and pivoted to the sides of the box whereby the gate may be swung upwardly and forwardly to open the rear end of the box, and means connected with and operated by one of the arms for effectively connecting and disconnecting the said driving means for the conveyor, and said connecting means including a lost motion device whereby the driving means for the conveyor may be controlled independently when the gate is in its open position.

JOHN P. SEAHOLM.

REFERENCES CITED

The following references are of record in the file of this patent:

UNITED STATES PATENTS

| Number | Name | Date |
|---|---|---|
| 696,643 | Kinney | Apr. 1, 1902 |
| 842,238 | Park | Jan. 29, 1907 |
| 867,019 | Dennis et al. | Sept. 24, 1907 |
| 888,747 | Rude et al. | May 26, 1908 |
| 904,127 | Herrick | Nov. 17, 1908 |